United States Patent
Tsirkin

(10) Patent No.: US 9,569,223 B2
(45) Date of Patent: Feb. 14, 2017

(54) MIXED SHARED/NON-SHARED MEMORY TRANSPORT FOR VIRTUAL MACHINES

(71) Applicant: Red Hat Israel, Ltd., Raanana (IL)

(72) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 234 days.

(21) Appl. No.: 13/766,227

(22) Filed: Feb. 13, 2013

(65) Prior Publication Data

US 2014/0229686 A1    Aug. 14, 2014

(51) Int. Cl.
| | | |
|---|---|---|
| G06F 9/44 | (2006.01) | |
| G06F 9/48 | (2006.01) | |
| G06F 9/455 | (2006.01) | |
| G06F 9/50 | (2006.01) | |
| G06F 9/54 | (2006.01) | |

(52) U.S. Cl.
CPC .............. *G06F 9/44* (2013.01); *G06F 9/45533* (2013.01); *G06F 9/4881* (2013.01); *G06F 9/50* (2013.01); *G06F 9/544* (2013.01); *G06F 9/545* (2013.01)

(58) Field of Classification Search
CPC .... G06F 12/0813; G06F 9/5016; G06F 3/067; G06F 9/461; G06F 9/3851; G06F 9/3836; G06F 9/4881; G06F 9/4843; G06F 9/45533; G06F 9/5077; G06F 9/45537; G06F 9/52
USPC ...................................... 711/147, 6; 718/180
See application file for complete search history.

(56) References Cited

U.S. PATENT DOCUMENTS

| | | | | |
|---|---|---|---|---|
| 4,965,717 A * | 10/1990 | Cutts, Jr. | ............... | G06F 9/3824 711/148 |
| 5,428,761 A * | 6/1995 | Herlihy | ............... | G06F 12/0831 711/130 |
| 5,873,120 A * | 2/1999 | Harvey | ................. | G06F 9/5016 711/173 |
| 5,949,994 A * | 9/1999 | Dupree | ................... | G06F 9/462 712/228 |
| 6,075,938 A * | 6/2000 | Bugnion | ................. | G06F 9/544 703/27 |
| 6,247,109 B1 * | 6/2001 | Kleinsorge | .............. | G06F 9/461 711/153 |
| 7,093,260 B1 * | 8/2006 | Garfinkle | ............ | G06F 9/30123 718/102 |

(Continued)

OTHER PUBLICATIONS

Onoue Koichi, A Virtual Machine Migration System Based on a CPU Emulator, IEEE, First International Workshop on Virtualization Technology in Distributed Computing, 2006, p. 3.*

(Continued)

*Primary Examiner* — Jared Rutz
*Assistant Examiner* — Khoa D Doan
(74) *Attorney, Agent, or Firm* — Lowenstein Sandler LLP

(57) ABSTRACT

Methods, systems and computer program products are provided for mixed shared/non-shared memory transport in virtual machines. A computer-implemented method may include providing a shared memory area writeable by a first virtual processor and a second virtual processor that are runnable on a host CPU, retrieving the information stored in the shared memory area by the first virtual processor when the first virtual processor stops running on the host CPU and before the second virtual processor runs on the host CPU, and storing the retrieved information from the shared memory area in a non-shared memory.

19 Claims, 5 Drawing Sheets

(56) References Cited

U.S. PATENT DOCUMENTS

| | | | | |
|---|---|---|---|---|
| 7,434,002 B1* | 10/2008 | Zedlewski | G06F 11/3409 | 711/130 |
| 7,478,388 B1* | 1/2009 | Chen | G06F 9/45554 | 718/1 |
| 7,853,954 B2* | 12/2010 | Haruki | G06F 9/3009 | 712/228 |
| 8,108,879 B1* | 1/2012 | Garlick | G06F 9/52 | 712/43 |
| 8,214,845 B2* | 7/2012 | Hoover | G06F 15/7825 | 711/147 |
| 8,266,629 B2* | 9/2012 | Inoue | G06F 9/544 | 718/1 |
| 8,296,775 B2* | 10/2012 | Thornton | G06F 9/45533 | 712/228 |
| 8,352,938 B2* | 1/2013 | Hunt | G06F 9/4856 | 718/1 |
| 8,413,146 B1* | 4/2013 | McCorkendale | G06F 9/45558 | 711/6 |
| 8,522,253 B1* | 8/2013 | Rozas | G06F 9/45558 | 711/205 |
| 8,775,625 B2* | 7/2014 | Narayanaswamy | G06F 9/4856 | 709/226 |
| 2004/0268354 A1* | 12/2004 | Kanai | G06F 9/45533 | 718/100 |
| 2005/0138442 A1* | 6/2005 | Keller, Jr. | G06F 1/3203 | 713/300 |
| 2005/0251806 A1* | 11/2005 | Auslander | G06F 9/45533 | 718/100 |
| 2005/0268298 A1* | 12/2005 | Hunt | G06F 9/4856 | 718/1 |
| 2005/0289551 A1* | 12/2005 | Wojtkiewicz | G06F 9/4881 | 718/103 |
| 2007/0067590 A1* | 3/2007 | Savagaonkar | G06F 12/145 | 711/163 |
| 2007/0079090 A1* | 4/2007 | Rajagopal | G06F 12/1491 | 711/163 |
| 2007/0169121 A1* | 7/2007 | Hunt et al. | | 718/1 |
| 2009/0094438 A1* | 4/2009 | Chakraborty | G06F 1/3203 | 712/30 |
| 2009/0113110 A1* | 4/2009 | Chen | G06F 9/4426 | 711/6 |
| 2009/0144510 A1* | 6/2009 | Wibling | G06F 9/5016 | 711/147 |
| 2009/0172346 A1* | 7/2009 | Sahita | G06F 9/5077 | 711/208 |
| 2009/0204959 A1* | 8/2009 | Anand | G06F 9/5027 | 718/1 |
| 2009/0249331 A1* | 10/2009 | Davis | G06F 9/45558 | 718/1 |
| 2010/0023707 A1* | 1/2010 | Hohmuth | G06F 9/466 | 711/152 |
| 2010/0228903 A1* | 9/2010 | Chandrasekaran | G06F 9/45558 | 711/6 |
| 2011/0004735 A1* | 1/2011 | Arroyo | G06F 9/455 | 711/162 |
| 2011/0010713 A1* | 1/2011 | Matsumoto | G06F 9/4881 | 718/1 |
| 2011/0078702 A1* | 3/2011 | Hosoki | G06F 9/461 | 718/108 |
| 2011/0099555 A1* | 4/2011 | Kwon | G06F 15/7875 | 718/108 |
| 2011/0154318 A1* | 6/2011 | Oshins | G06F 9/45537 | 718/1 |
| 2011/0213934 A1* | 9/2011 | Greenhalgh | G06F 1/3293 | 711/146 |
| 2011/0213935 A1* | 9/2011 | Greenhalgh | G06F 1/3203 | 711/146 |
| 2012/0030335 A1* | 2/2012 | Machida | | 709/223 |
| 2012/0096459 A1* | 4/2012 | Miyazaki | G06F 9/45558 | 718/1 |
| 2012/0331464 A1* | 12/2012 | Saito | G06F 9/5077 | 718/1 |
| 2013/0117760 A1* | 5/2013 | Cuadra | G06F 9/3861 | 718/108 |
| 2013/0174144 A1* | 7/2013 | Cheng | G06F 9/45558 | 718/1 |
| 2014/0006877 A1* | 1/2014 | Zhu | G06F 11/3466 | 714/45 |
| 2014/0130060 A1* | 5/2014 | Pope | G06F 9/4843 | 718/108 |
| 2014/0201761 A1* | 7/2014 | Dalal | H04L 47/193 | 718/108 |

OTHER PUBLICATIONS

Jui-Hao Chiang, Physical Machine State Migration, IEEE, IEEE 17th International Conference on Parallel and Distrubuted System, Dec. 2011, pp. 25-32.*

VMWare Support, Moving a Virtual Machine, Feb. 20, 2003.*

Tian, Kevin, How virtualization makes power management different, Jun. 27-30, 2007, Proceedings of the Linux Syposium, Intel.*

* cited by examiner

__(1)__

MIXED SHARED/NON-SHARED MEMORY TRANSPORT FOR VIRTUAL MACHINES

TECHNICAL FIELD

Examples of the present disclosure relate to virtual machines, and more specifically, relate to memory management in virtualized computing systems.

BACKGROUND

Computer memory generally refers to logical or physical storage used to provide applications and data on a temporary or permanent basis. Shared memory is usually accessible from multiple applications and/or devices and provides efficient communication between different computing resources.

In a physical computing system, shared memory may refer to a unit of random access memory (RAM) that is accessible from different central processing units (CPUs). In software, shared memory may be an area of RAM used by different processes for exchanging data. In virtualized computing environments, shared memory can be used to provide fast communication between a hypervisor and a virtual machine.

DETAILED DESCRIPTION

Figure 1:
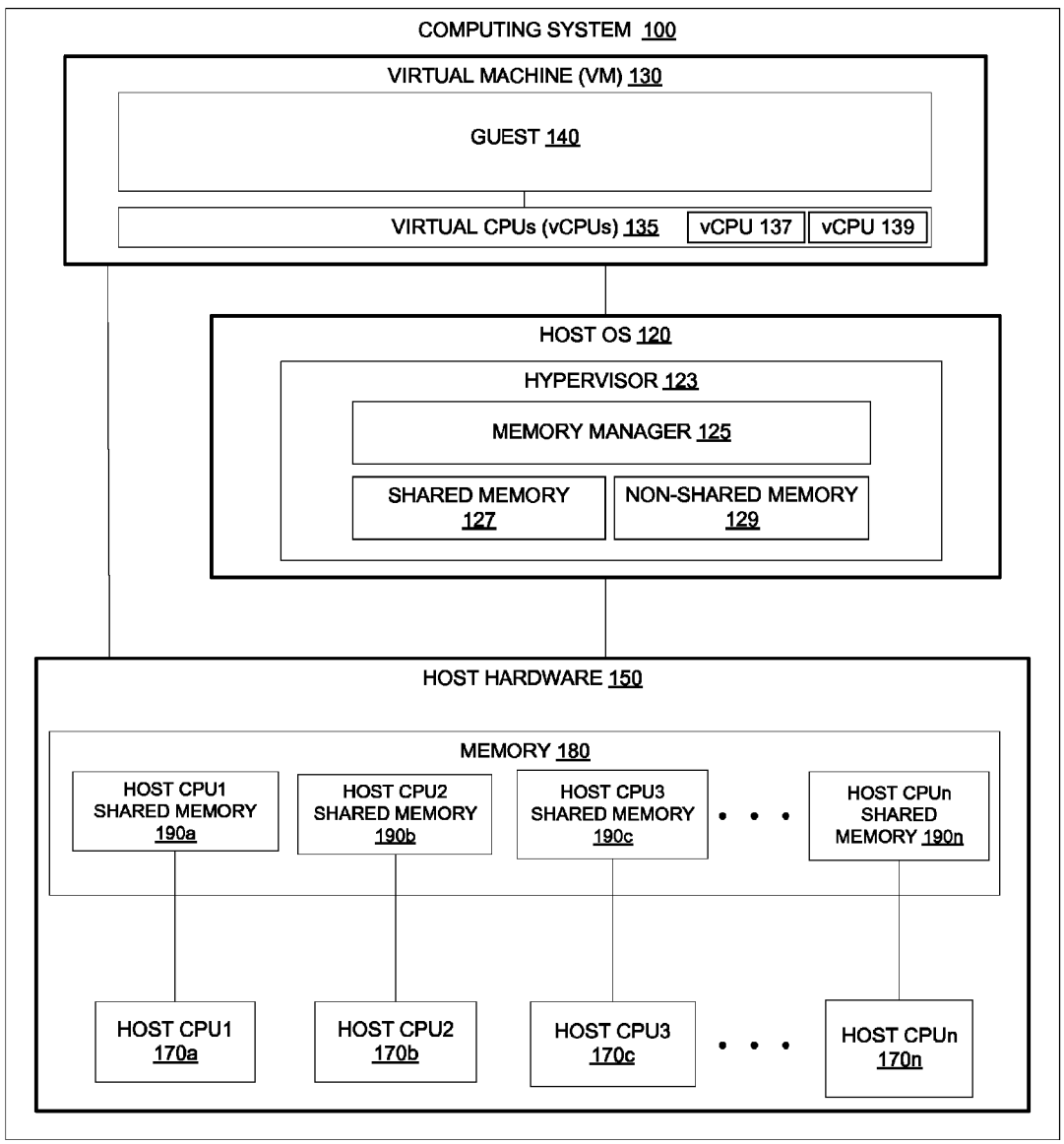
FIG. 1 is a block diagram illustrating an example of a computer system hosting one or more virtual machines.

Disclosed herein are methods, systems, and computer program products for providing mixed shared/non-shared memory transport in virtual machines (VMs). Shared memory may be provided for communication between a hypervisor and a virtual machine (VM). However, general shared memory that is writeable by multiple VMs can be overwritten. Further, a hypervisor scans general shared memory during operations to determine when new information exists and also requires additional memory as the number of guests increases. Therefore, it is advantageous to use non-shared memory in conjunction with shared memory to reduce memory scans and the overall amount of memory needed by a virtual machine.

In an example, a hypervisor provides a shared memory area writeable by a first virtual processor and a second virtual processor, which are runnable on a host CPU. The first virtual processor stores information in the shared memory area when running on the host CPU. The hypervisor retrieves the information stored in the shared memory area by the first virtual processor when the first virtual processor is not running on the host CPU and before a different virtual processor begins to run on the host CPU. The hypervisor then stores the information retrieved from the shared memory area in a non-shared memory area, for example, to preserve the information for later access and/or transport.

In another example, a hypervisor provides a shared memory area for a host CPU from host memory that is accessible to the hypervisor. The hypervisor maps guest memory accessible to a virtual processor to the host memory of the shared memory area. The mapping is performed to allow the virtual processor to write to the shared memory area and occurs before the virtual processor runs on the host CPU. The virtual processor then stores information in the shared memory area of the host CPU when running on the host CPU.

Additionally, the hypervisor may retrieve the information stored by the virtual processor in the shared memory area of the host CPU when the virtual processor stops running on the host CPU and before a different virtual processor begins running on the host CPU. The hypervisor also may store the information retrieved from the shared memory area of the host CPU in a non-shared memory area. The hypervisor also may remove the mapping between the guest memory and the host memory so that the virtual processor can no longer access the shared memory area of the host CPU. The mapping may be removed, for example, prior to when the virtual processor runs on a different host CPU.

In a further example, the hypervisor provides a second shared memory area for another host CPU from additional host memory that is accessible to the hypervisor. The hypervisor maps guest memory accessible to the virtual processor to the additional host memory of the second shared memory area for the other host CPU. The virtual processor then stores information in the second shared memory area when running on the other host CPU. Additionally, the hypervisor may copy or transport information from non-shared memory to the second shared memory area, for example, prior to running the virtual processor on the other CPU.

Accordingly, efficient methods, systems, and computer program products are provided to allow mixed shared/non-shared memory transport in virtual machines. Such methods, systems, and computer program products improve the efficiency and scalability of virtualized computing systems.

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

FIG. 1 is a block diagram illustrating an example of a computer system hosting one or more virtual machines. The computing system 100 hosts a virtual machine (VM) 130, which may also be referred to as the "source VM." The virtual machine 130 runs a guest (e.g., guest 140) that uses a guest operating system to manage its resources. The virtual machine 130 may run the same or different guest operating systems, such as Microsoft Windows®, Linux®, Solaris®, Mac® OS, etc. The computing system 100 may be a server, a workstation, a personal computer (PC), a mobile phone, a palm-sized computing device, a personal digital assistant (PDA), etc.

Throughout the following description, the term "guest" refers to the computer readable instructions run on the hypervisor 123 that is installed on a disk, loaded into memory, or currently running. A guest 140 may include one or more of the following: a firmware copy in memory, an operating system, additional installed software, a browser, applications running on the browser, etc. The term "virtual machine" (VM) 130 refers to part of a host system that is visible to the guest 140. A virtual machine 130 may include one or more of the following: memory (e.g., shared memory 127, non-shared memory 129), virtual CPUs 135 (e.g., vCPU 137, vCPU 139), virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

The computing system 100 runs a hypervisor 123 to virtualize access to the underlying host hardware 150, making the use of the virtual machine 130 transparent to the guest 140 and the users of the computing system 100. The hypervisor 123 may support the virtual machine 130. In one example, the hypervisor 123 is part of a host operating system (OS) 120.

The computing system 100 also includes hardware components (host hardware 150) including multiple host central processing units (CPUs) 170 (e.g., host CPU 1 170a, host CPU 2 170b, host CPU 3 170c . . . host CPUn 170n). The computing system 100 also may include memory 180, input/output (I/O) devices and other hardware components (not shown). In an example, the memory 180 may include shared memory, such as, multiple shared memory ranges 190 associated with one of the multiple host CPUs 170 (e.g., host CPU1 shared memory 190a, host CPU2 shared memory 190b, host CPU3 shared memory 190c, host CPUn shared memory 190n).

In one example, multiple host CPUs 170a . . . 170n are configured to execute a thread configured to receive and perform events based on event requests from virtual processors (e.g., vCPUs 135) of the source VM 130. The thread may include any sequence of programmed instructions that may be managed by the host OS 120, such as, for example, instructions of an application. Example event requests submitted by a guest 140 include a request to transmit a packet, a request to perform a disk I/O operation, a request to output an image to a display, a request to send data on a serial port, etc.

The hypervisor 123 includes a memory manager 125 to allocate and manage shared memory 127 and non-shared memory 129. In an example, the memory manager 125 may provide shared memory 127 for a guest 140, which is accessible and writable by multiple virtual processors (vCPUs 135). In another example, the memory manager 125 also may provide other shared memory 127 that is accessible to and writeable by both a plurality of guests and a plurality of virtual processors. Further, the memory manager 125 may manage multiple areas of shared memory 127 for different guests and/or different groups of guests.

In an example, the memory manager 125 also provides non-shared memory 129 for the hypervisor 123. For example, non-shared memory 129 may include memory that is only accessible by the hypervisor 123. Non-shared memory 129 also may include memory that is accessible by the hypervisor 123 and a specific guest 140 (but not accessible between multiple virtual guests).

In an example, the memory manager 125 may transfer information written in shared memory 127 by a virtual processor to non-shared memory 129. For example, the hypervisor 123 may execute a first virtual processor on a host CPU. The hypervisor 123 then may switch to executing another virtual processor on the same host CPU. During the switch, the memory manager 125 may transport the information in shared memory 127 from the first virtual processor to non-shared memory 129 for later use and/or restoration. Preserving the information in non-shared memory 129 ensures the consistency and integrity of the data, which may otherwise be overwritten by the second virtual processor accessing the shared memory 127 area.

In an example, the memory manager 125 manages memory range designations and assignments to shared memory areas associated with respective host CPUs 170. For example, the memory manager may map areas of shared memory 127 and non-shared memory 129 to shared memory areas for host CPUs (e.g., host CPU1 shared memory 190a, host CPU2 shared memory 190b, host CPU3 shared memory 190c, host CPUn shared memory 190n). Thus, memory manager 125 may map physical/virtual guest memory accessible by a virtual processor to a shared memory for a host CPU, allowing the virtual processor to access and write to the shared memory of the host CPU where it is assigned to run.

Figure 2:
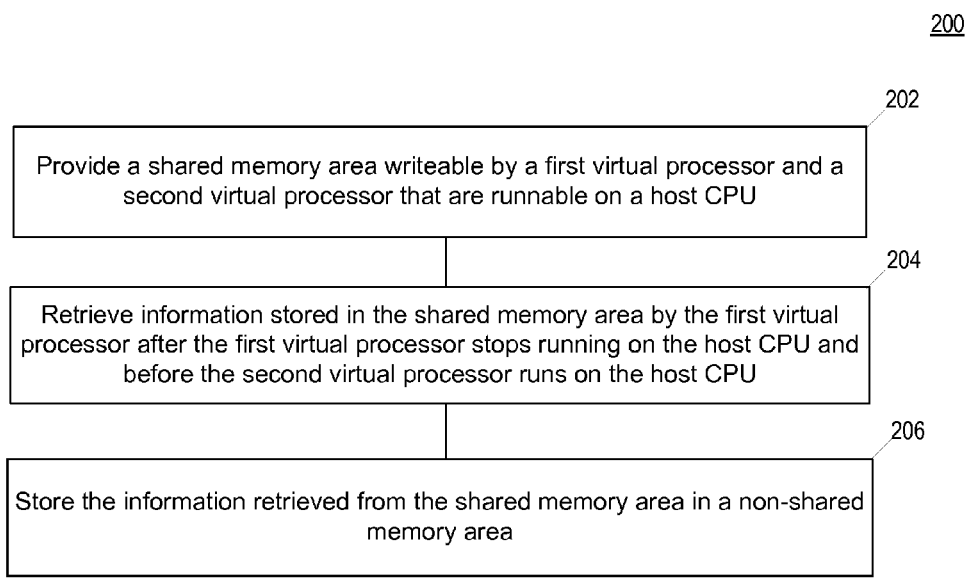
FIG. 2 is a flow diagram illustrating an example of a method for providing mixed shared/non-shared memory management for a virtual processor running on a host CPU.

FIG. 2 is a flow diagram illustrating an example of a method for providing mixed shared/non-shared memory management for a virtual processor running on a host CPU. The method 200 may be performed by processing logic that may comprise computer hardware (circuitry, dedicated logic, programmable logic, microcode, etc.), software (such as instructions run on a general purpose computer system, dedicated machine, or processing device), firmware, or a combination thereof. In one example, the method 200 is performed by the hypervisor 123 of FIG. 1.

At block 202, a shared memory area writeable by a first virtual processor and a second virtual processor runnable on a host CPU is provided. For example, the hypervisor may provide the shared memory area based on one or more of a system configuration, initialization of a hypervisor, initialization of a virtual machine, and when detecting a virtual processor that is runnable on a host processor.

In an example, the hypervisor 123 may provide shared memory 127 writeable by multiple virtual processors (vCPUs) 135, such as vCPU 137 and vCPU 139. In one example, the hypervisor 123 runs multiple virtual processors vCPUs 135 (e.g., vCPU 137 and vCPU 139) on a physical host CPU (e.g., host CPU1 170a, host CPU2 170b, host CPU3 170c . . . host CPUn 170n). The hypervisor 123 runs a single virtual processor on the host CPU at a time and may periodically switch between running different virtual processors on the same host CPU.

For example, the hypervisor 123 may run a virtual processor (e.g., vCPU 137) on a host CPU (e.g., CPU1 170a) for a period of time. The hypervisor 123 may stop vCPU 137 so that it is no longer running on host CPU1 170a and then may run a different virtual processor (e.g., vCPU 139) on host CPU1 170a. Further, the hypervisor 123 then may continue switching between running different vCPUs 135 on the host CPU1 170a.

In one example, information from the first virtual processor running on a host CPU is stored in the shared memory area. In an example, a first virtual processor (e.g., vCPU 137) writes information to shared memory 127 provided by the hypervisor 123 when executing on the host CPU (e.g., host CPU1 170a). For example, vCPU 137 may store processing related data such as execution state, temporary data, processing results, and information used to communicate with the host CPU1 170a in the shared memory 127.

At block 204, the information from the first virtual processor stored in the shared memory area is retrieved after the first virtual processor stops running on the host CPU and before the second virtual processor begins running on the host CPU. In an example, the hypervisor 123 switches between running different virtual processors (e.g., vCPU 137, vCPU 139) on a host CPU (e.g., host CPU 1 170*a*). Further, the hypervisor 123 also provides the virtual processors (vCPUs 135) with access to the shared memory 127 for a guest.

In an example, the hypervisor 123 stops vCPU 137 from running on host CPU1 170*a*. The hypervisor 123 then retrieves the information that vCPU 137 has stored in the shared memory 127 while running on host the CPU1 170*a*. The hypervisor 123 also may retrieve the information that vCPU 137 has stored in the shared memory 127 prior to running vCPU 139 on host CPU1 170*a*, for example, to preserve the context or execution state of vCPU 137 for later resumed processing.

At block 206, the information from the first virtual processor retrieved from the shared memory area is stored in a non-shared memory area. In an example, the hypervisor 123 stores the information retrieved from shared memory 127 in a non-shared memory 129 area when transitioning between running different virtual processors (vCPUs 135) on a host CPU. For example, the hypervisor 123 may copy/transport information from shared memory 127 to a non-shared memory area 129. The non-shared memory 129 may be accessible to the hypervisor 123 and a guest 140 (e.g., not shared between multiple guests). The non-shared memory 129 also may be a private region of memory that only is accessible to the hypervisor 123.

In an example, the non-shared memory 129 may include processing-related information that was previously generated by a virtual processor that executed on the host CPU. For example, the hypervisor 123 already may have run vCPU 139 on host CPU1 170*a*, and vCPU 139 may have stored information in shared memory 127 when executing on host CPU1 170*a*. Further, the hypervisor 123 may have copied or transported the information from the shared memory 127 to the non-shared memory 129 when, for example, vCPU 139 stopped running on host CPU 1 170*a*. The hypervisor 123 may copy or transport information from shared memory 127 to non-shared memory 129, for example, to preserve the context or execution state of a virtual processor. Such preservation may occur, for example, when the hypervisor 123 transitions between running different virtual processors on a host CPU.

In an example, the hypervisor 123 copies/transports the information previously generated by a virtual processor from non-shared memory 129 to shared memory 127. For example, the hypervisor 123 may copy or transport information from non-shared memory 129 to shared memory 127 to allow a virtual processor to resume execution from a previously stored context/execution state. In one example, the hypervisor 123 restores a previously stored context/execution state to shared memory 127 to allow a virtual processor to resume execution from a point in time on the same host CPU or a different host CPU.

In another example, the hypervisor 123 may provide contextual information for a virtual processor stored in the non-shared memory 129 before and/or at any time during resumed execution of the virtual processor on a host CPU. For example, the hypervisor 123 may access the contextual information in the non-shared memory 129 when preparing a virtual processor for resumed execution either on the same host CPU or on another host CPU. Further, the hypervisor 123 may access the contextual information in non-shared memory 129, in addition to, or in lieu of copying/transporting the information to shared memory 127.

In one example, the hypervisor 123 clears and/or reinitializes an area of shared memory 127 that has been preserved in non-shared memory 129. For example, the hypervisor 123 may clear a portion of shared memory 127 that was copied/transported to non-shared memory 129 when switching between virtual processors, each from different virtual machines. The hypervisor 123 may clear and/or reinitialize an area of shared memory previously used by another virtual processor from another virtual machine, for example, to avoid mixing data between virtual machines and/or to ensure data privacy. In one example, the hypervisor overwrites previously stored data with a predefined data pattern (e.g., all zeros) to clear and reinitialize the area of shared memory.

In an additional example, the hypervisor 123 provides shared memory 127 and non-shared memory 129 in adjacent ranges of host memory. For example, shared memory 127 and non-shared memory 129 may be provided in adjacent host memory to allow a virtual processor to address both as a single range of memory.

Figure 3:
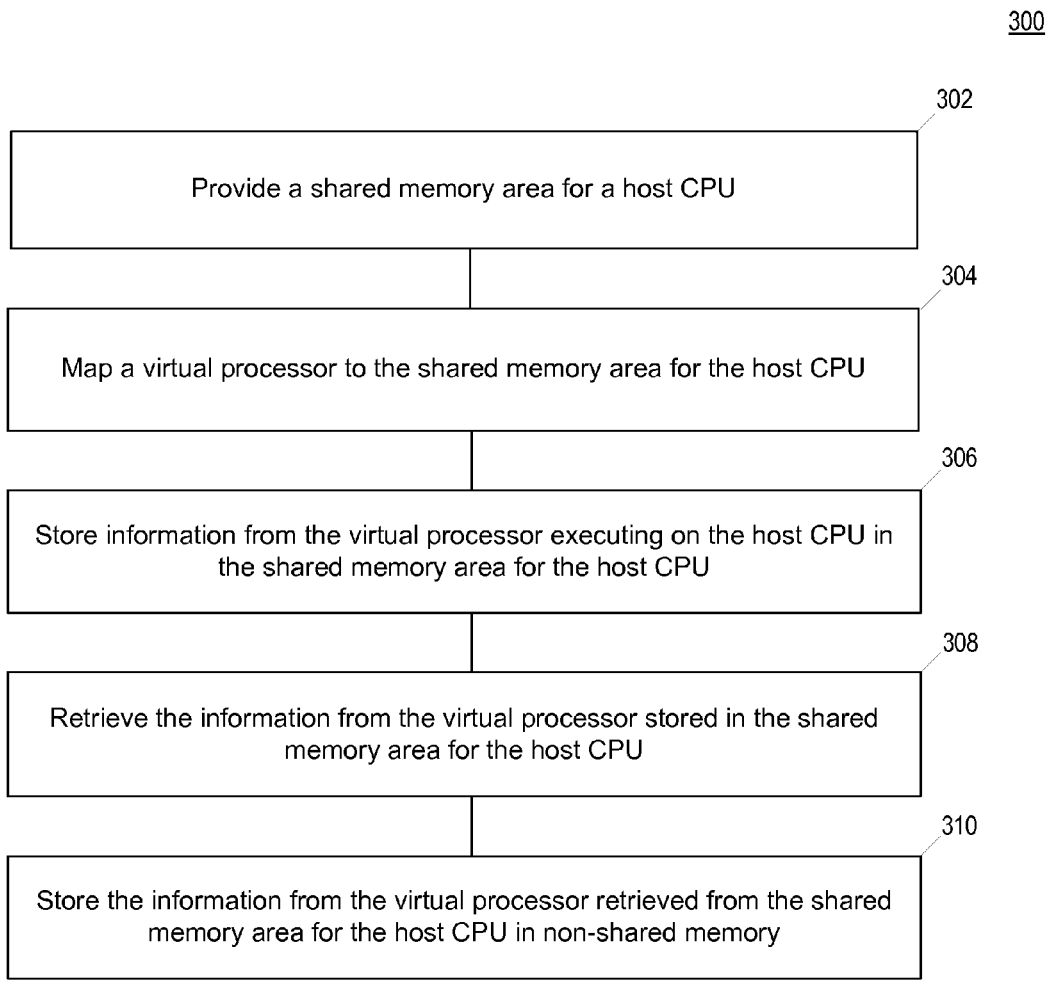
FIG. 3 is a flow diagram illustrating an example of a method for providing mixed shared/non-shared memory management for a virtual processor running on a host CPU using shared memory of the host CPU.

FIG. 3 is a flow diagram illustrating an example of a method for providing mixed shared/non-shared memory management for a virtual processor running on a host CPU using shared memory of the host CPU. The method 300 may be performed by processing logic that may comprise computer hardware (circuitry, dedicated logic, programmable logic, microcode, etc.), software (such as instructions run on a general purpose computer system, dedicated machine, or processing device), firmware, or a combination thereof. In one example, the method 300 is performed by the hypervisor 123 of FIG. 1.

At block 302, a shared memory area is provided for a host CPU. For example, the hypervisor may provide the shared memory area based on one or more of a system configuration, initialization of a hypervisor, initialization of a virtual machine, and when detecting a virtual processor that is runnable on a host processor.

In an example, the hypervisor 123 provides host CPU1 170*a* with a dedicated shared memory area, host CPU1 shared memory 190*a*. A shared memory area provided for a host CPU may be accessible only to a single host CPU, meaning the shared memory is not accessible from other host CPUs. However, the host CPU shared memory area may be shared among a host CPU and other computing resources, for example, such as virtual processors (vCPUs 135). Further, multiple host CPUs each may have their own area of shared memory provided by the hypervisor 123 (e.g., host CPU1 170*a* may utilize host CPU1 shared memory 190*a*, host CPU2 170*b* may utilize host CPU2 shared memory 190*b*, host CPU3 170*c* may utilize host CPU3 shared memory 190*c*, and so forth).

At block 304, a virtual processor is mapped to the shared memory area provided for the host CPU. In an example, the hypervisor 123 associates virtual memory accessible to a virtual processor with host memory designated as shared memory for a host CPU. For example, the hypervisor 123 may map physical guest memory (e.g., memory available to a guest operating system running in a virtual machine) or virtual guest memory (e.g., a virtual address space presented by a guest operating system) to host memory 180 that serves as shared memory for host a CPU (e.g., host CPU1 shared memory 190*a* . . . host CPUn shared memory 190*n*). The hypervisor 123 also may provide physical guest memory from, for example, shared memory 127 and/or non-shared memory 129.

In an example, virtual memory that is accessible to a virtual processor is mapped to a shared memory area provided for a host CPU. For example, the hypervisor may create the mapping when initializing a virtual processor to run on a host CPU. The virtual processor then may use the mapping to access and write to the shared memory area of the host CPU when running on the host CPU.

In another example, the hypervisor 123 may later remove the mapping providing the virtual processor with access to the shared memory area for the host CPU. For example, the hypervisor 123 may switch to running a different virtual processor on the host CPU and/or may decide to run the virtual processor on a different host CPU. The hypervisor 123 may remove the mapping to prevent the virtual processor from accessing and/or writing to the shared memory area of the host CPU where it no longer runs.

At block 306, information from the virtual processor executing on the host CPU is stored in the shared memory area for the host CPU. In one example, a virtual processor runs on a host CPU and has access to the shared memory area of the host CPU. The virtual processor may access and/or write information to the shared memory area of the host CPU when running on the host CPU where it is assigned.

At block 308, the information from the virtual processor stored in the shared memory area for the host CPU is retrieved. In an example, the hypervisor 123 retrieves information that a virtual processor has stored in a shared memory area for a host processor. For example, the hypervisor 123 may retrieve information that vCPU 137 stored in host CPU1 shared memory 190a when vCPU was running on host CPU1 170a.

At block 310, the information from the virtual processor retrieved from the shared memory area for the host CPU is stored in non-shared memory. In one example, the hypervisor 123 preserves the context/execution state of a virtual processor stored in the shared memory provided for a host CPU. For example, vCPU 137 may store processing related information to host CPU1 shared memory 190a when executing on host CPU1 170a. The hypervisor 123 then may decide to run a different virtual processor (e.g., vCPU 139) on host CPU1 170a. The hypervisor 123 then may preserve the information from vCPU 137 stored in host CPU1 shared memory 190a by copying or transporting the information to non-shared memory 129 for later access and/or retrieval.

In one example, the hypervisor 123 may copy and/or transport information from the shared memory of a host CPU to non-shared memory after stopping the virtual processor from running on the host CPU and prior to running a different virtual processor on the host CPU. Further, the hypervisor 123 may leave the information that was copied and/or transported in non-shared memory, for example, when the hypervisor is switching between running two virtual processors from the same virtual machine.

In another example, the hypervisor 123 may copy and/or transport information stored in non-shared memory 129 to the shared memory area of a host CPU when resuming execution of a virtual processor on a corresponding host CPU. For example, the hypervisor 123 may transport information from non-shared memory 129 to a shared memory area for a host CPU (e.g., host CPU1 shared memory 190a) to resume execution of vCPU 137 on the same host CPU (host CPU1 170a) or a different host CPU (host CPU2 170b). Thus, a preserved context/execution state of a virtual processor may be provided to allow the virtual processor to resume execution on the same host CPU or different host CPU.

Figure 4:
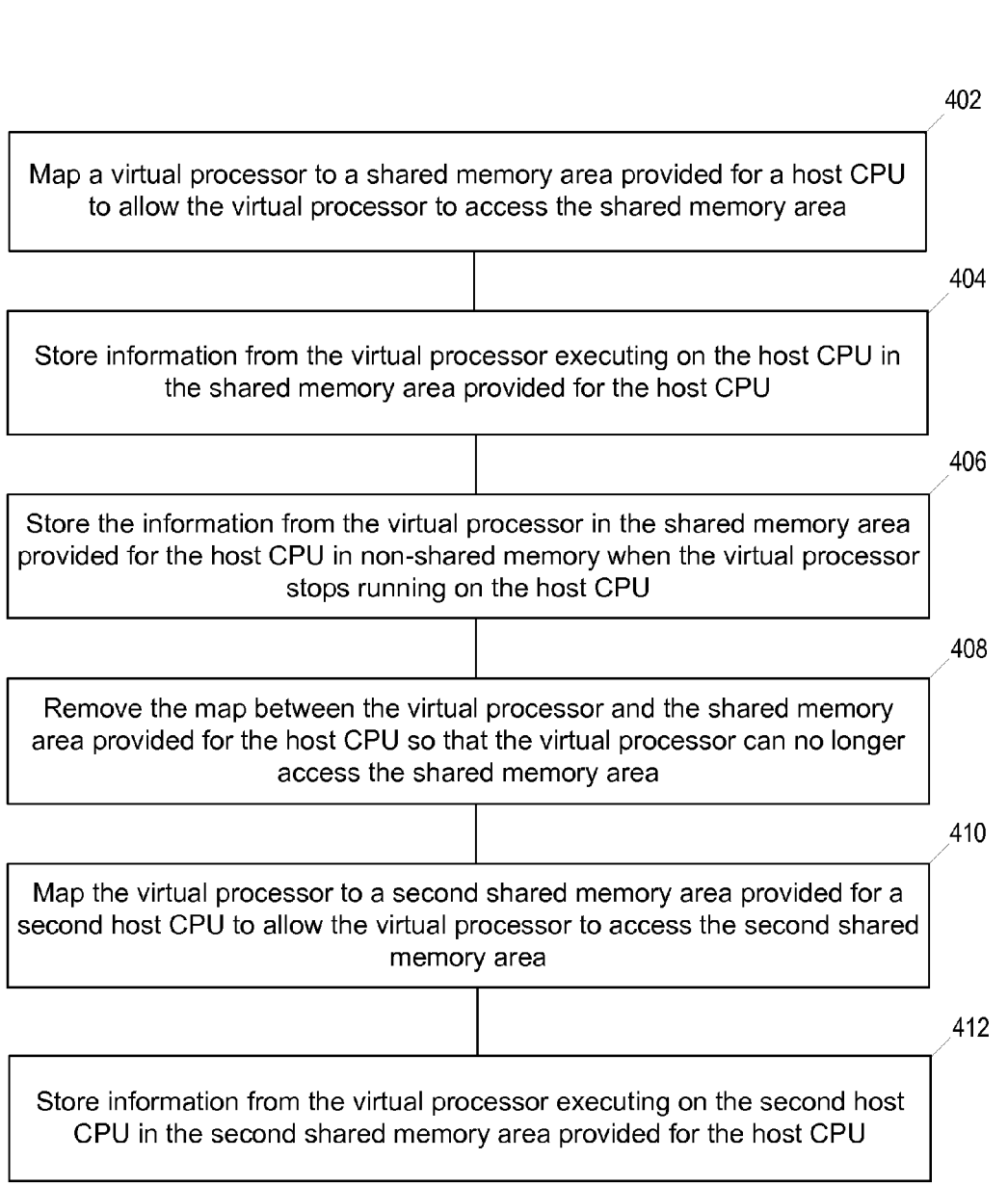
FIG. 4 is a flow diagram illustrating an example of a method for providing mixed shared/non-shared memory management for a virtual processor that runs on multiple host CPUs.

FIG. 4 is a flow diagram illustrating an example of a method for providing mixed shared/non-shared memory management for a virtual processor that runs on multiple host CPUs. The method 400 may be performed by processing logic that may comprise computer hardware (circuitry, dedicated logic, programmable logic, microcode, etc.), software (such as instructions run on a general purpose computer system, dedicated machine, or processing device), firmware, or a combination thereof. In one example, the method 400 is performed by the hypervisor 123 of FIG. 1.

At block 402, a virtual processor is mapped to a shared memory area provided for a host CPU to allow the virtual processor to access the shared memory area provided for the host CPU. In an example, the hypervisor 123 may map physical guest memory (e.g., memory available to a guest operating system running in a virtual machine) or virtual guest memory (e.g., a virtual address space presented by a guest operating system) to host memory 180 serving as shared memory for host a CPU. For example, the hypervisor 123 may map shared memory 127 or non-shared memory 129 accessible from vCPU 137 to host CPU1 shared memory 190a, allowing vCPU 137 to write to the shared memory area when executing on host CPU1 170a.

In one example, the mapping between the memory accessible to the virtual processor and the host memory 180 is maintained in a table. A virtual processor (e.g., vCPU 137, vCPU 139) may be mapped at different times to different host CPU shared memory areas based on the same physical/virtual guest memory. Thus, it may not be necessary to notify a guest when a virtual processor has been remapped to a different area of host CPU shared memory. For example, the virtual processor may continue to use the same physical/virtual guest memory remapped to a different host CPU shared memory area. Otherwise, it may be necessary to notify a guest when a virtual processor is remapped using different physical/virtual guest memory.

At block 404, information from the virtual processor executing on the host CPU is stored in the shared memory area provided for the host CPU. In an example, vCPU 137 executes on host CPU1 170a and writes information to host CPU1 shared memory 190a. In one example, the hypervisor 123 notifies a virtual processor when the shared memory area provided for a host CPU becomes writeable. For example, the hypervisor 123 first may notify vCPU 137 when host CPU1 shared memory 190a is writeable. In one example, vCPU 137 may access host CPU1 shared memory 190a, for example, based on a mapping provided in block 402.

At block 406, the information from the virtual processor stored in the shared memory area provided for the host CPU is then stored in non-shared memory when the virtual processor stops running on the host CPU. In an example, the hypervisor 123 runs vCPU 137 on host CPU1 170a and decides to switch to running vCPU 139 on host CPU1 170a. The hypervisor 123 may stop vCPU 137 and retrieve the information vCPU 137 has stored in host CPU1 shared memory 190a. The hypervisor 123 then may store the retrieved information, for example, in non-shared memory 129.

At block 408, the map between the virtual processor and the shared memory area provided for the host CPU is removed so that the virtual processor can no longer access the shared memory area provided for the host CPU. In an example, the hypervisor 123 removes the mapping between the virtual memory accessible to vCPU 137 and the host memory 180 providing host CPU1 shared memory 190a. The hypervisor 123 also may notify vCPU 137 when host CPU1 shared memory 190a becomes non-writeable. The hypervisor 123 may remove the mapping, for example, to run another virtual processor (e.g., vCPU 139) on host CPU1 170a. The hypervisor then may map vCPU 139 to host CPU1 shared memory area 190a and begin running vCPU 139 on host CPU1 170a.

At block 410, the virtual processor is mapped to a second shared memory area provided for a second host CPU to allow the virtual processor to access the second shared memory area provided for the second host CPU. In an example, the hypervisor 123 decides to switch vCPU 137 to run on host CPU2 170b. For example, physical/virtual guest memory accessible to vCPU 137 may be mapped to host CPU2 shared memory 190b to allow vCPU 137 to write to the shared memory area.

At block 412, information from the virtual processor executing on the second host CPU is stored in the second shared memory area provided for the host CPU. In an example, the hypervisor 123 retrieves information that was previously copied/transported from host CPU1 shared memory to non-shared memory when vCPU 137 was stopped on host CPU1. The hypervisor 123 may restore the information to host CPU2 shared memory 190b and resume executing vCPU 137 on host CPU2 170b using the restored information.

Figure 5:
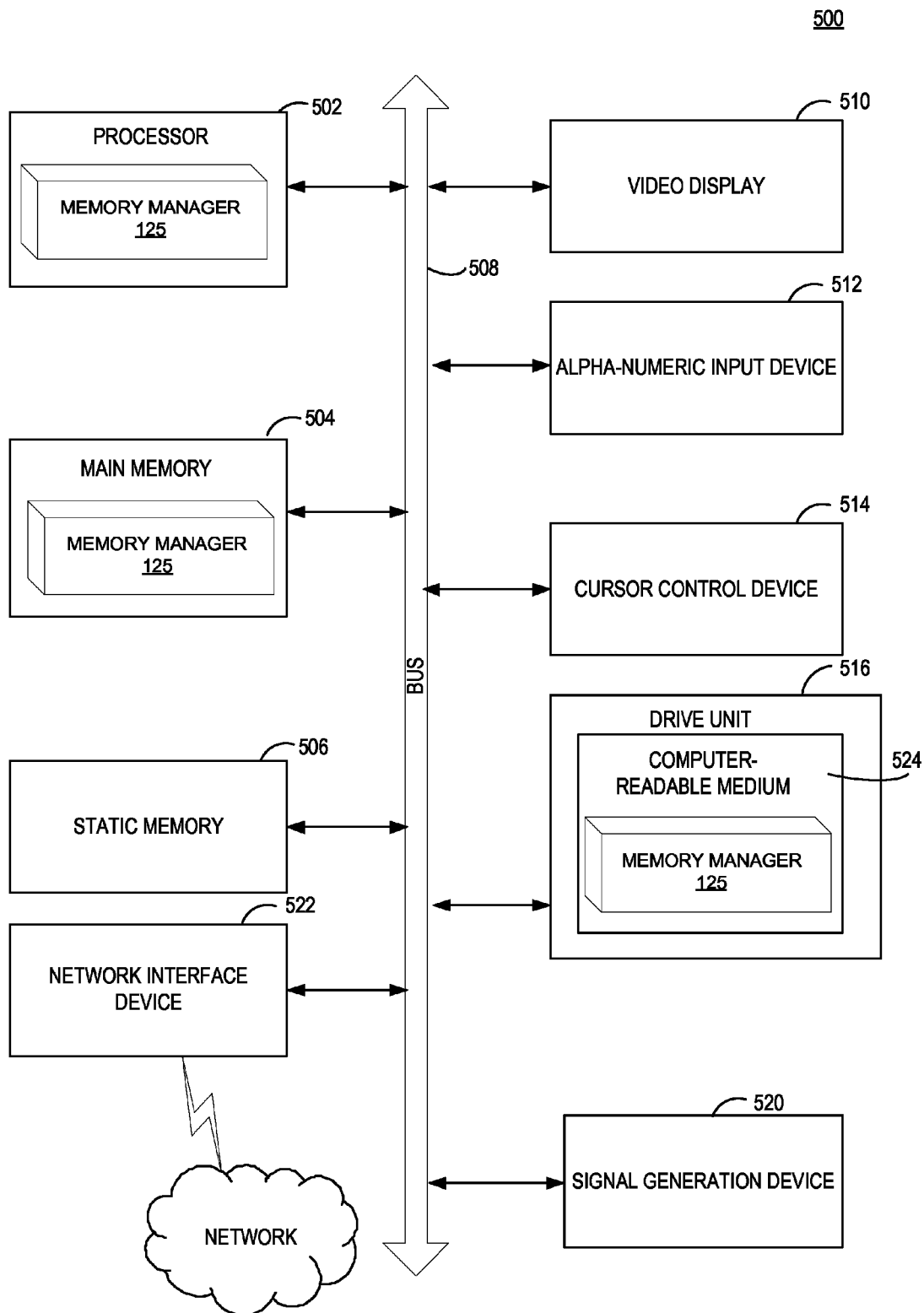
FIG. 5 illustrates a diagrammatic representation of a machine in the exemplary form of a computer system.

FIG. 5 illustrates a diagrammatic representation of a machine in the example form of a computer system 500 within which a set of instructions, for causing the machine to perform any of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The memory manager 125 of the hypervisor 123 shown in FIG. 1 may be executed by processor 502 configured to perform the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

A drive unit 516 may include a computer-readable medium 524 on which is stored one or more sets of instructions (e.g., instructions of the memory manager 125 of the hypervisor 123) embodying any one or more of the methodologies or functions described herein. The instructions of the memory manager 125 may also reside, completely or at least partially, within the main memory 504 and/or within the processor 502 during execution thereof by the computer system 400, the main memory 504 and the processor 502 also constituting computer-readable media. The instructions of the memory manager 125 may further be transmitted or received over a network via the network interface device 522.

While the computer-readable storage medium 524 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "providing", "identifying", "detecting", "instructing", "performing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
providing, by a processing device executing a hypervisor of a host computer, a shared memory area writeable by a first virtual processor and a second virtual processor that are runnable on the processing device, wherein the shared memory area is associated with the processing device and is shared by the hypervisor with the first virtual processor and the second virtual processor;
storing, in the shared memory area by the processing device executing the hypervisor, information accessible by the first virtual processor;
in response to determining that the first virtual processor has stopped running on the processing device, retrieving, by the processing device executing the hypervisor, the information stored in the shared memory area before the second virtual processor starts running on the processing device; and
storing, by the processing device executing the hypervisor, the information retrieved from the shared memory area in a non-shared memory area, wherein the non-shared memory area is accessible by the hypervisor, but is inaccessible by the first virtual processor and by the second virtual processor.

2. The method of claim 1, further comprising:
restoring, by the processing device executing the hypervisor, other information associated with the second virtual processor from the non-shared memory area to the shared memory area.

3. The method of claim 1, further comprising:
accessing, by the processing device executing the hypervisor, the information from the first virtual processor stored in the non-shared memory area.

4. The method of claim 3, wherein the accessing is performed when the first virtual processor resumes running on the host CPU.

5. The method of claim 1, further comprising:
removing, by the processing device executing the hypervisor, the information stored in the shared memory area by the first virtual processor.

6. The method of claim 5, wherein the removing is performed when the first virtual processor and the second virtual processor are associated with different virtual machines.

7. The method of claim 1, wherein the shared memory area and the non-shared memory area are provided in adjacent host physical memory.

8. A system comprising:
a memory comprising a shared memory area; and
a processing device, operatively coupled to the memory to host a hypervisor and having access to the memory, to:
provide, by the hypervisor, the shared memory area writeable by a first virtual processor and a second virtual processor that are runnable on the processing device, wherein the shared memory area is associated with the processing device and is shared by the hypervisor with the first virtual processor and the second virtual processor;
store, in the shared memory area by the hypervisor, information accessible by the first virtual processor;
in response to determining that the first virtual processor has stopped running on the processing device, retrieve the information stored in the shared memory area before the second virtual processor runs on the processing device; and
store the information retrieved from the shared memory area in a non-shared memory area, wherein the non-shared memory area is accessible by the hypervisor, but is inaccessible by the first virtual processor and by the second virtual processor.

9. The system of claim 8, wherein the processing device is further to:
restore, from the non-shared memory area to the shared memory area, other information previously stored in the shared memory area by the second virtual processor.

10. The system of claim 8, wherein the processing device is further to:
access the information from the first virtual processor stored in the non-shared memory area.

11. The system of claim 8, wherein the first virtual processor stores information in the shared memory area when running on the processing device.

12. The system of claim 8, wherein the processing device is further to:
remove the information stored in the shared memory area by the first virtual processor.

13. The system of claim 12, wherein the processing device is to remove the information when the first virtual processor and the second virtual processor are associated with different virtual machines.

14. The system of claim 8, wherein the shared memory area and the non-shared memory area are provided in adjacent host physical memory.

15. A method comprising:
providing, by a processing device executing a hypervisor of a host computer, a first shared memory area associated with the processing device, the first shared memory area being allocated from host memory accessible by the hypervisor and shared by the hypervisor with a plurality of virtual processors running on the processing device;

mapping, by the processing device executing the hypervisor, guest memory accessible by a first virtual processor to the first shared memory area associated with the processing device;

storing, by the processing device executing the first virtual processor via the guest memory, information accessible by the first virtual processor in the first shared memory area; and in response to determining that the first virtual processor has stopped running on the processing device, storing, by the processing device executing the hypervisor, the information in a non-shared memory area, wherein the non-shared memory area is accessible by the hypervisor, but inaccessible by the first virtual processor and by the second virtual processor.

16. The method of claim 15, further comprising:
retrieving, by the processing device executing the hypervisor, the information from the first virtual processor stored in the first shared memory area associated with the processing device when the first virtual processor stops running on the processing device.

17. The method of claim 15, further comprising:
providing, by the processing device executing the hypervisor, a second shared memory area associated with a second processing device, the second shared memory area allocated from host memory accessible to the hypervisor; and mapping, by the processing device executing the hypervisor, the guest memory accessible to the first virtual processor to the second shared memory area associated with the second processing device.

18. The method of claim 15, further comprising:
retrieving, by the processing device executing the hypervisor, the information from the first virtual processor stored in the non-shared memory area; and storing, by the processing device executing the hypervisor, the retrieved information in the second shared memory area associated with the second processing device.

19. The method of claim 18, further comprising:
executing the second processing device using the information from the first virtual processor stored in the second shared memory area associated with the second processing device.

* * * * *